United States Patent
Coen et al.

[11] Patent Number: 6,105,537
[45] Date of Patent: Aug. 22, 2000

[54] MODULAR BIRD FEEDER SYSTEM

[76] Inventors: Robert L Coen; Virginia Coen, both of 11419 Reed Rd., Licking, Mo. 65542

[21] Appl. No.: 09/321,154

[22] Filed: May 27, 1999

[51] Int. Cl.[7] ................................................ A01K 7/00
[52] U.S. Cl. ........................................... 119/51.01
[58] Field of Search ..................... 119/51.01, 51.5, 119/52.1, 52.2, 52.3, 52.4, 53, 53.5, 54, 57.8, 57.9, 72

[56] References Cited

U.S. PATENT DOCUMENTS

| | | | |
|---|---|---|---|
| 4,355,597 | 10/1982 | Blasbalg | 119/51 |
| 4,690,101 | 9/1987 | Kilham | 119/52.2 |
| 5,239,944 | 8/1993 | Hostetler | 119/72 |
| 5,924,382 | 7/1999 | Shumaker | 119/72 |

*Primary Examiner*—Thomas Price

[57] ABSTRACT

A new Modular Bird Feeder System for providing an easily adaptable and expandable bird feeder for dispensing bird feed. The inventive device includes a primary feeder member having feeding access holes therein, terminating members connectable to the primary feeder member, removable closure members for closing the terminating members, coupling members for coupling the members together, and suspension members for suspending the members.

19 Claims, 3 Drawing Sheets

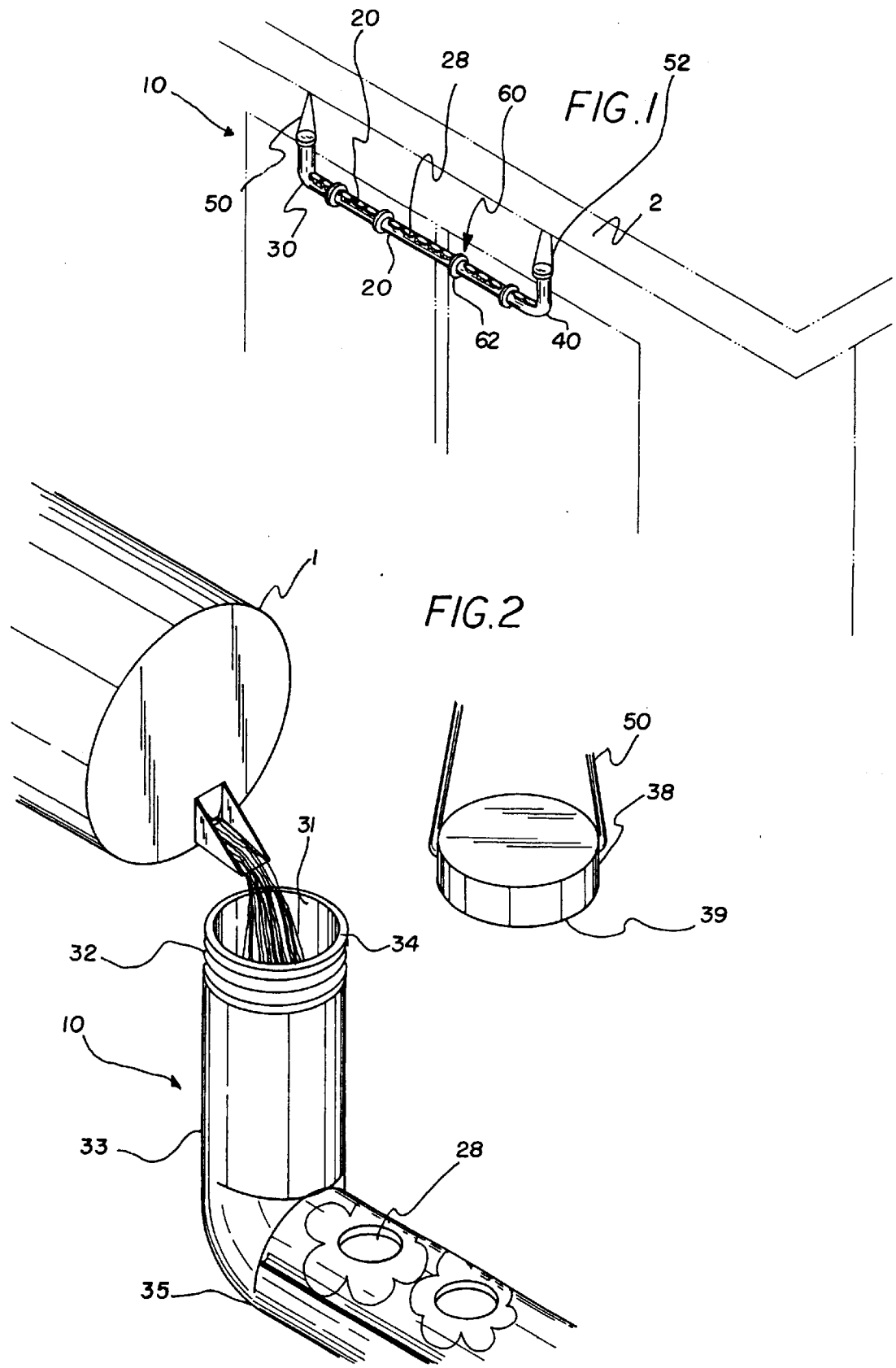

MODULAR BIRD FEEDER SYSTEM

BACKGROUND OF THE INVENTION

1. Field of the Invention

The present invention relates to Bird Feeders and more particularly pertains to a new Modular Bird Feeder System for providing an easily adaptable and expandable bird feeder for dispensing bird feed.

2. Description of the Prior Art

The use of Bird Feeders is known in the prior art. More specifically, Bird Feeders heretofore devised and utilized are known to consist basically of familiar, expected and obvious structural configurations, notwithstanding the myriad of designs encompassed by the crowded prior art which have been developed for the fulfillment of countless objectives and requirements.

Known prior art Bird Feeders include U.S. Pat. Nos. 3,913,527; 4,938,168, U.S. Pat. No. 252,288; U.S. Pat. Nos. 5,269,259; 4,691,665 and 5,062,390.

While these devices fulfill their respective, particular objectives and requirements, the aforementioned patents do not disclose a new Modular Bird Feeder System. The inventive device includes a primary feeder member having feeding access holes therein, terminating members connectable to the primary feeder member, removable closure members for closing the terminating members, coupling members for coupling the members together, and suspension members for suspending the members.

In these respects, the Modular Bird Feeder System according to the present invention substantially departs from the conventional concepts and designs of the prior art, and in so doing provides an apparatus primarily developed for the purpose of for providing an easily adaptable and expandable bird feeder for dispensing bird feed.

SUMMARY OF THE INVENTION

In view of the foregoing disadvantages inherent in the known types of Bird Feeders now present in the prior art, the present invention provides a new Modular Bird Feeder System construction wherein the same can be utilized for providing an easily adaptable and expandable bird feeder for dispensing bird feed.

The general purpose of the present invention, which will be described subsequently in greater detail, is to provide a new Modular Bird Feeder System apparatus and method which has many of the advantages of the Bird Feeders mentioned heretofore and many novel features that result in a new Modular Bird Feeder System which is not anticipated, rendered obvious, suggested, or even implied by any of the prior art Bird Feeders, either alone or in any combination thereof.

To attain this, the present invention generally comprises a primary feeder member having feeding access holes therein, terminating members connectable to the primary feeder member, removable closure members for closing the terminating members, coupling members for coupling the members together, and suspension members for suspending the members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Modular Bird Feeder System apparatus and method which has many of the advantages of the Bird Feeders mentioned heretofore and many novel features that result in a new Modular Bird Feeder System which is not anticipated, rendered obvious, suggested, or even implied by any of the prior art Bird Feeders, either alone or in any combination thereof.

It is another object of the present invention to provide a new Modular Bird Feeder System which may be easily and efficiently manufactured and marketed.

It is a further object of the present invention to provide a new Modular Bird Feeder System which is of a durable and reliable construction.

An even further object of the present invention is to provide a new Modular Bird Feeder System which is susceptible of a low cost of manufacture with regard to both materials and labor, and which accordingly is then susceptible of low prices of sale to the consuming public, thereby making such Modular Bird Feeder System economically available to the buying public.

Still yet another object of the present invention is to provide a new Modular Bird Feeder System which provides in the apparatuses and methods of the prior art some of the advantages thereof, while simultaneously overcoming some of the disadvantages normally associated therewith.

Still another object of the present invention is to provide a new Modular Bird Feeder System for providing an easily adaptable and expandable bird feeder for dispensing bird feed Yet another object of the present invention is to provide a new Modular Bird Feeder System which includes a primary feeder member having feeding access holes therein, terminating members connectable to the primary feeder member, removable closure members for closing the terminating members, coupling members for coupling the members together, and suspension members for suspending the members.

Still yet another object of the present invention is to provide a new Modular Bird Feeder System that provides a modular bird feeder system that may be easily reconfigured with the addition or removal of the specialized modular elements of the inventive system.

Even still another object of the present invention is to provide a new Modular Bird Feeder System that provides a bird feeder for containing liquid bird food featuring simplified disassembly, cleanability, and reassembly for reuse.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new Modular Bird Feeder System according to the present invention particularly illustrating the feeder system in use in a depending relationship from the roof overhang of a building.

FIG. 2 is a schematic perspective of a broken away portion of the bird feeder system particularly illustrating a manner of refilling the bird feeder system with a liquid bird feed.

DESCRIPTION OF THE PREFERRED EMBODIMENT

Figure 3:
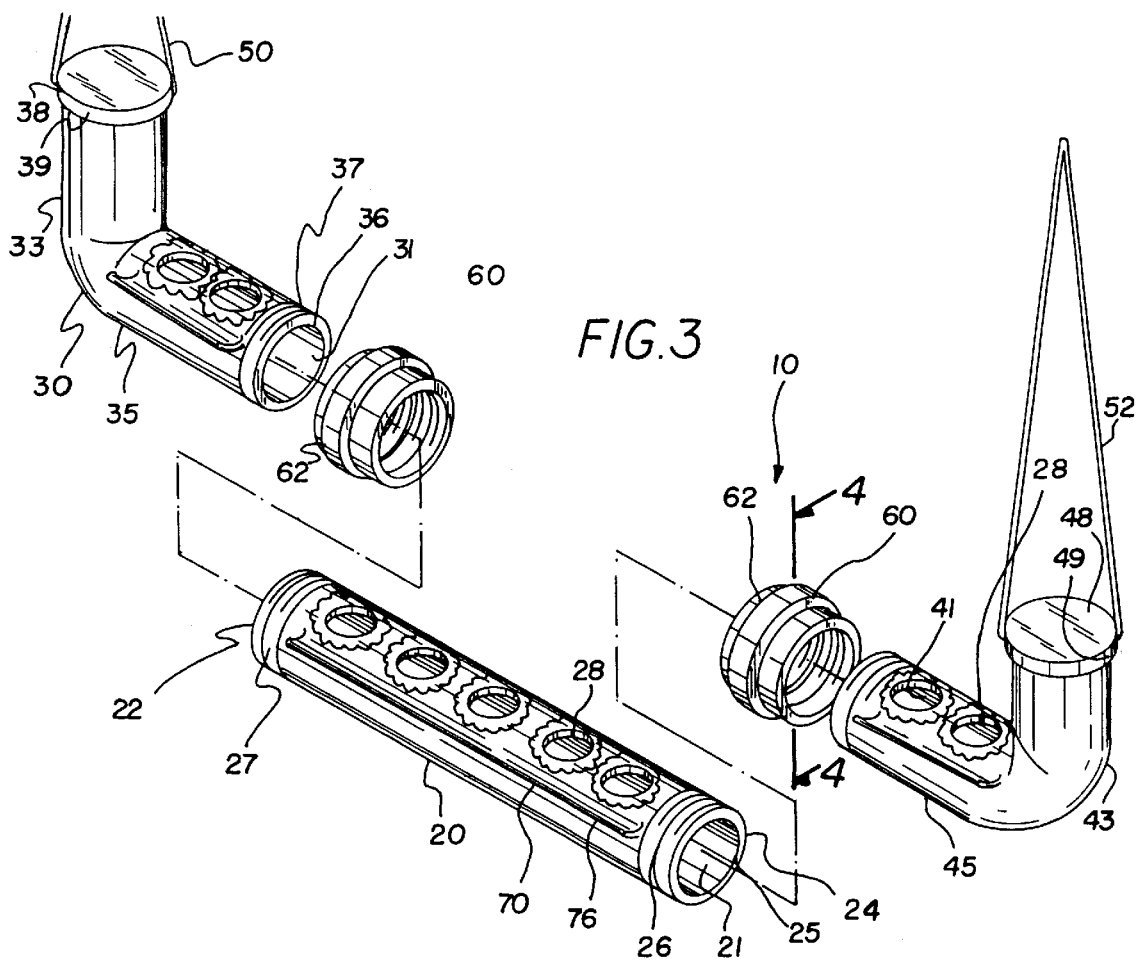
FIG. 3 is a schematic exploded isometric illustration of the present invention.

With reference now to the drawings, and in particular to FIGS. 1 through 7 thereof, a new Modular Bird Feeder System embodying the principles and concepts of the present invention and generally designated by the reference numeral 10 will be described.

More specifically, it will be noted that the Modular Bird Feeder System 10 comprises at least one primary member 20 with a plurality of feed access holes 28, at least two terminating members 30,40 each attached to the primary member 20, and a support means 50,52 attached to each terminating member 30,40.

As best illustrated in FIGS. 1 through 6, it can be shown that the invention is most preferably provided in the form of a kit for a modular bird feeder. The elements of a kit may be used alone to form a bird feeder assembly, or may optionally be combined with another kit of the invention (having a similar or different combination of parts) to form a multitude of different bird feeder assembly configurations. Significantly, the configuration of the bird feeder may be easily adapted to or reconfigured for different mounting locations, and may be easily enlarged or made smaller as desired.

The bird feeder system of the invention includes at least one substantially elongate primary member 20. The primary member 20 has a substantially hollow interior 21 for holding bird feed 1 therein, and the bird feed 1 contained in the primary member 20 is accessible by a bird through at least one feed access hole 28 in the wall of the primary member 20.

The primary member 20 preferably has a plurality of feed access holes 28 arranged in a substantially linear relationship. Optionally, the feed access holes 28 may be arranged in two (or more) substantially parallel lines to provide a higher density of available access holes in the primary member 20. The feed access holes 28 are preferably located on the primary member 20 so that they are positionable at an upper or top location on the primary member 20 to hold the bird feed 1 in the primary member 20 and permit a bird to insert its beak downwardly through the feed access hole 28 to access bird feed held in the interior 21.

The preferred primary member 20 is a substantially tubular member and ideally has a cylindrical form with a circular cross section, although other configurations may optionally be used. The primary member has longitudinal end portions 22,24 at opposite ends of the member. Each end portion 22,24 has an opening 25 that opens into the interior 21 of the primary member 20.

Preferably, each end portion 22,24 of the primary member 20 is provided with connection means 26,27 for removably connecting the primary member 20 to another member. The most preferred connection means 26,27 comprises threads cut into the exterior surface of the primary member 20 adjacent to the end opening 25.

The bird feeder of the invention further includes at least two terminating members 30,40. Each terminating member 30,40 is adapted to connect to a longitudinal end portion 22,24 of a primary member 20 to provide termination at an end of the bird feeder system 10. The terminating member 30, 40 has a substantially hollow interior 31,41, and the terminating member is preferably connectable to another member (e.g., a primary member or another terminating member) so that the interiors of the connected members are in fluid communication with each other. In this manner, bird feed 1 loaded or poured into the terminating member 30,40 is free to move to another member connected to the terminating member 30,40.

The terminating member 30,40 preferably has mounting means 32 located thereon for mounting support means 50,52. The support means 50,52 provide an element for suspending the terminating member 30,40 from above such that the terminating member 30,40 supports in a substantially horizontal orientation all primary members 20 connected thereto. Preferably, the terminating member 30,40 has an L-shaped configuration with legs 33,35,43,45 extending from a substantially right angle from a juncture 37,47. At the end portion of each leg 33,35,43,45, there is a leg opening 34,36,46.. Also preferably, the terminating members 30,40 each have at least one feed access hole 28 through them to access to bird feed in their hollow interiors 31,41.

Preferably, the modular bird feed system 10 has a closure means 38,48 removably mounted to a leg opening 34 of a the terminating member 30 to close the leg opening 34 and to permit filling of the interior 31,41 of the terminating member 30,40 and any connected primary members 20 with bird feed 1. The preferred removable closure means 38,48 comprises a removable cap 39,49 threadably couplable to a leg 33,43 of the terminating member 30,40.

A support means 50,52 is removably mounted on each closure means 38,48 for supporting and suspending the terminating members 30,40 connected to the closure means 38,48 and any primary members 20 connected to the terminating members 30,40. The support means 50,52 allows the suspension of the invention from structures such as the overhang of a roof 2 as shown in FIGS. 1 and 5.

Figure 4:
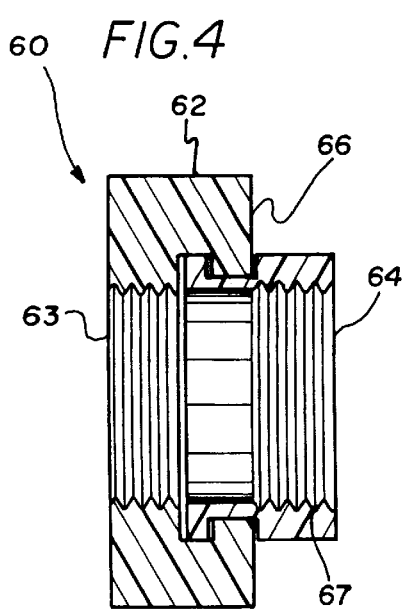
FIG. 4 is a schematic sectional view of the invention taken along line 4—4 of FIG. 3.

Between each adjacent member, whether they are terminating member 30,40 or a primary member 20, there is a coupling means 60. The coupling means 60 removably couples the members together. Preferably, the coupling means 60 comprises a hollow coupler member 62 with opposite coupling ends 63,64 each adapted to receive the end portion 22,24 of a primary member 20. The coupler member 62 is attached to the members in a manner such that members coupled to the coupler member 62 are connected in fluid communication with each other to allow bird feed to pass within their hollow interiors 21,31,41. The coupler member 70 may be constructed as a single integral member or optionally, as shown in FIG. 4, as a two part member. In the two part member version, the coupler member 70 comprises a pair of coupler portions 66,67 rotatably mounted to each other to permit free rotation of either portion. Each coupler portion 66,67 has a coupling end 63,64 to allow coupling to either a primary member 20 or a terminating member 30,40.

Figure 5:
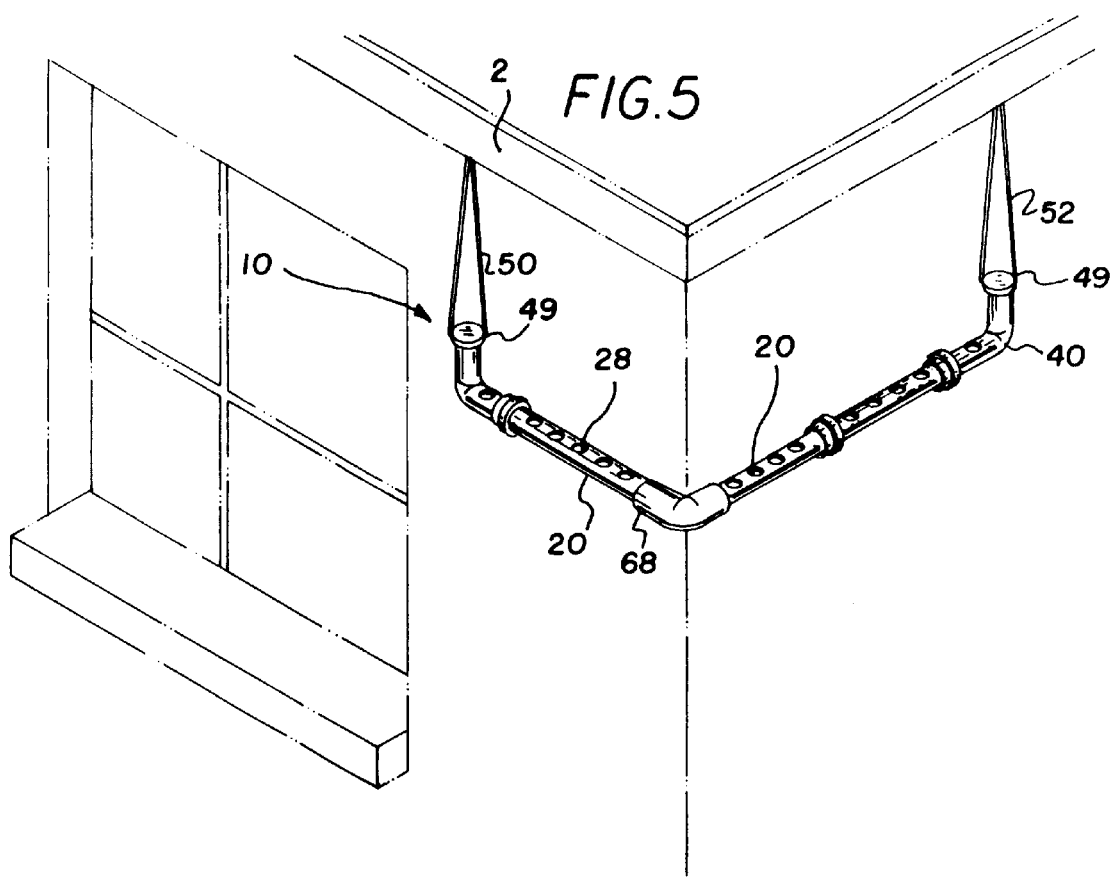
FIG. 5 is a schematic perspective view of an optional configuration of the invention particularly illustrating the ability of the inventive bird feeder system to extend around the corner of a building.

As depicted in FIG. 5, an elbow coupler member is shown as an optional embodiment of the coupling means 60. Like all coupling means 60, the elbow coupler member 68 includes opposing coupling ends 62,63 for connecting adjacent members. The elbow coupler member 68 is substantially L-shaped to allow the hanging of the invention around corners such as the corner of a building as shown in FIG. 5.

To provide a foot grip for a bird feeding from the feed access holes 28, the invention includes a roost means 70. The roost means 70 is located adjacent to the feed access holes 28 in a member. In one embodiment of roost means 70, the roost means 70 comprises a pair of tab extensions 76,77 integrally included on the members and positioned adjacent the feed access holes 28.

Figure 6:
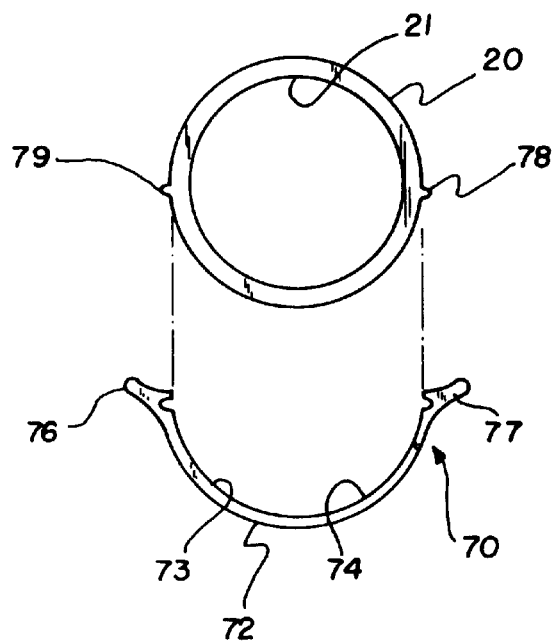
FIG. 6 is a schematic end view of an element of the invention particularly illustrating an optional attachable bird roost member.
Figure 7:
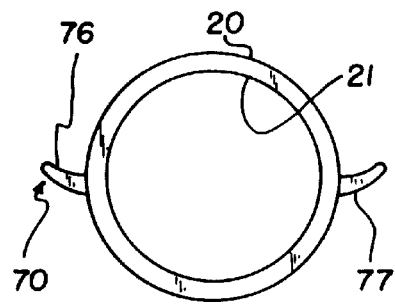
FIG. 7 is a schematic end view of an element of the invention particularly illustrating an optional bird roost integrally-formed with the element

FIG. 6 shows one optional embodiment of the roost means 70 where the roost means 70 is removably mounted to a the member. In this embodiment the removable roost means 70 comprises a roost member 72 in a substantially U-shaped configuration and having a curved wall 73 defining an interior channel 74. The interior channel 74 is shaped to receive a member in a position on the bottom portion of the members opposite the feed access holes. On each arm of the U-shaped channel 74 of the roost member 72 there is a tab extension 76,77. The tab extensions 76,77 are located on each arm such that placement of a member in the interior channel 74 positions the tab extensions 76,77 adjacent to the feed access holes 28 of the particular member. The removable roost member 72 is mounted to the member by a pair of tab mounts 78,79 running longitudinally on the members.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A kit for a modular bird feeder, comprising:
   an substantially elongate primary member having a substantially hollow interior for holding bird feed therein, said primary member having at least one feed access hole therein positionable at an upper location to permit a bird to insert its beak downwardly therethrough to access bird feed in the interior of said primary member, said primary member having a opposite longitudinal end portions each having an opening open to the interior of said primary member,
   at least two terminating members, each said terminating member having a substantially hollow interior and being adapted to connect to a longitudinal end portion of a said primary member such that the interiors of said primary member and said terminating member are in fluid communication; and
   wherein said terminating member includes a mounting means for mounting a support means thereon for suspending said terminating member and any primary member connected thereto in a substantially horizontal orientation.

2. The modular bird feeder system of claim 1, wherein said primary member is substantially circular in cross section.

3. The modular bird feeder system of claim 1, wherein the end portion of said primary member additionally comprises connection means for removably connecting said primary member to another member.

4. The modular bird feeder system of claim 3, wherein said connection means comprising threads about the exterior surface of said primary member adjacent to a said end opening thereof.

5. The modular bird feeder system of claim 1, wherein said terminating member has a substantially L-shaped configuration with legs extending at a substantially right angle from a juncture, and having a leg opening at the end portion of each leg of the L-shaped terminating member.

6. The modular bird feeder of claim 5 wherein said bird feeder additionally comprising a closure means removably mountable on a leg opening of a said terminating member to close said leg opening.

7. The modular bird feeder system of claim 6, wherein said removable closure means comprises a removable cap threadably couplable to a leg of a said terminating member.

8. The modular bird feeder system of claim 1, wherein said terminating members each have at least one access hole therein.

9. The modular bird feeder system of claim 1, additionally comprising a closure means removably mountable to a said terminating member to close the interior of said terminating member to thereby permit filling of the interior of said terminating member and any primary members connected thereto with bird feed.

10. The modular bird feeder of claim 1 wherein said support means is removably mounted on said mounting means on said terminating member for supporting said terminating member connected to said closure means and any primary members connected to said terminating member.

11. The modular bird feeder of claim 1 additionally comprising a coupling means for removably coupling said members together, said coupling means comprising a substantially hollow coupler member having opposite ends each adapted to receive the end portion of a said member in a manner such that the interiors of members coupled by said coupler member are in fluid communication with each other.

12. The modular bird feeder system of claim 11, wherein said roost means comprises a tab integrally formed on the exterior of a said member near a feed access hole.

13. The modular bird feeder system of claim 1, additionally comprising a roost means located adjacent to a said feed access hole in a said member for providing a foot grip for a bird feeding from said feed access hole.

14. The modular bird feeder system of claim 13, wherein said roost means is removably mountable on a said member.

15. The modular bird feeder system of claim 14, wherein said removable roost means comprises a roost member having a substantially U-shaped configuration having a curved wall defining an interior channel for receiving a member therein in a position opposite said access holes, said roost member having tab extensions on each arm of the U-shaped channel such that placement of a said member in the channel of said roost member positions said tab extensions adjacent to the access holes of said member.

16. A kit for a modular bird feeder, comprising:
   a substantially elongate primary member having a substantially hollow interior for holding bird feed therein, said primary member having at least one feed access hole therein positionable at an upper location to permit a bird to insert its beak downwardly therethrough to access bird feed in the interior of said primary member, said primary member having a opposite longitudinal end portions each having an opening open to the interior of said primary member,
   at least two terminating members, each said terminating member having a substantially hollow interior and being adapted to connect to a longitudinal end portion of a said primary member such that the interiors of said primary member and said terminating member are in fluid communication; and
   wherein said terminating member has a substantially L-shaped configuration with legs extending at a substantially right angle from a juncture, and having a leg opening at the end portion of each leg of the L-shaped terminating member.

17. The modular bird feeder of claim 16 wherein said bird feeder additionally comprising a closure means removably mountable on a leg opening of a said terminating member to close said leg opening.

18. The modular bird feeder of claim 17 wherein said removable closure means comprises a removable cap threadably couplable to a leg of a said terminating member.

19. A kit for a modular bird feeder, comprising:
   an substantially elongate primary member having a substantially hollow interior for holding bird feed therein, said primary member having at least one feed access hole therein positionable at an upper location to permit a bird to insert its beak downwardly therethrough to access bird feed in the interior of said primary member, said primary member having a opposite longitudinal end portions each having an opening open to the interior of said primary member,
   at least two terminating members, each said terminating member having a substantially hollow interior and being adapted to connect to a longitudinal end portion of a said primary member such that the interiors of said primary member and said terminating member are in fluid communication;
   a coupling means for removably coupling said members together, said coupling means comprising a substantially hollow coupler member having opposite ends each adapted to receive the end portion of a said member in a manner such that the interiors of members coupled by said coupler member are in fluid communication with each other; and
   wherein said roost means comprises a tab integrally formed on the exterior of a said member near a feed access hole.

* * * * *